United States Patent
Tsujii

(10) Patent No.: US 8,225,010 B2
(45) Date of Patent: Jul. 17, 2012

(54) DATA RECORDING APPARATUS AND METHOD

(75) Inventor: Hideaki Tsujii, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 12/959,520

(22) Filed: Dec. 3, 2010

(65) Prior Publication Data

US 2011/0153874 A1 Jun. 23, 2011

(30) Foreign Application Priority Data

Dec. 17, 2009 (JP) ................................ 2009-286963

(51) Int. Cl.
*G06F 3/14* (2006.01)
*G06F 3/00* (2006.01)
*G03B 17/24* (2006.01)

(52) U.S. Cl. ........... 710/16; 396/310; 715/864; 715/866

(58) Field of Classification Search .................. 396/310, 396/321; 710/1, 15, 16; 715/764, 768, 781, 715/810, 811, 814, 828, 864, 866

See application file for complete search history.

(56) References Cited

FOREIGN PATENT DOCUMENTS

| EP | 1187450 A2 | 3/2002 |
|---|---|---|
| JP | 2007-311956 | 11/2007 |

OTHER PUBLICATIONS

Nikon D90 User's Manual; Sep. 18, 2008; Nikon; pp. i-278.*
Rob Galbraith, Eye-Fi Collaborates with Nikon to introduce the Eye-Fi Connected Nikon D90 Digital SLR Camera, Digital Photography Insights, Aug. 27, 2008 Http://www.robgalbraith.com/bins/content_page.asp?cid=7-9314-9577 XP002629999.
The above references were cited in a European Search Report issued on Apr. 21, 2011, which is enclosed, that issued in the corresponding European Patent Application No. 10194139.1.

* cited by examiner

*Primary Examiner* — Richard B Franklin
(74) *Attorney, Agent, or Firm* — Cowan, Liebowitz & Latman, P.C.

(57) ABSTRACT

A data recording apparatus includes a connection unit which is capable of connecting, as a recording medium, a first recording medium having a predetermined function and a second recording medium that does not have the predetermined function. The data recording apparatus detects a connection status of the recording medium to the connection unit, controls a menu concerning setting of the predetermined function. If the detection unit detects that the first recording medium is connected to the connection unit, the data recording apparatus makes the menu operable. If the detection unit detects that the first recording medium is removed and then detects that the second recording medium is connected to the connection unit, the data recording apparatus makes the menu inoperable, and maintains the menu in the operable state during a period from removal of the first recording medium to connection of the second recording medium to the connection unit.

11 Claims, 8 Drawing Sheets

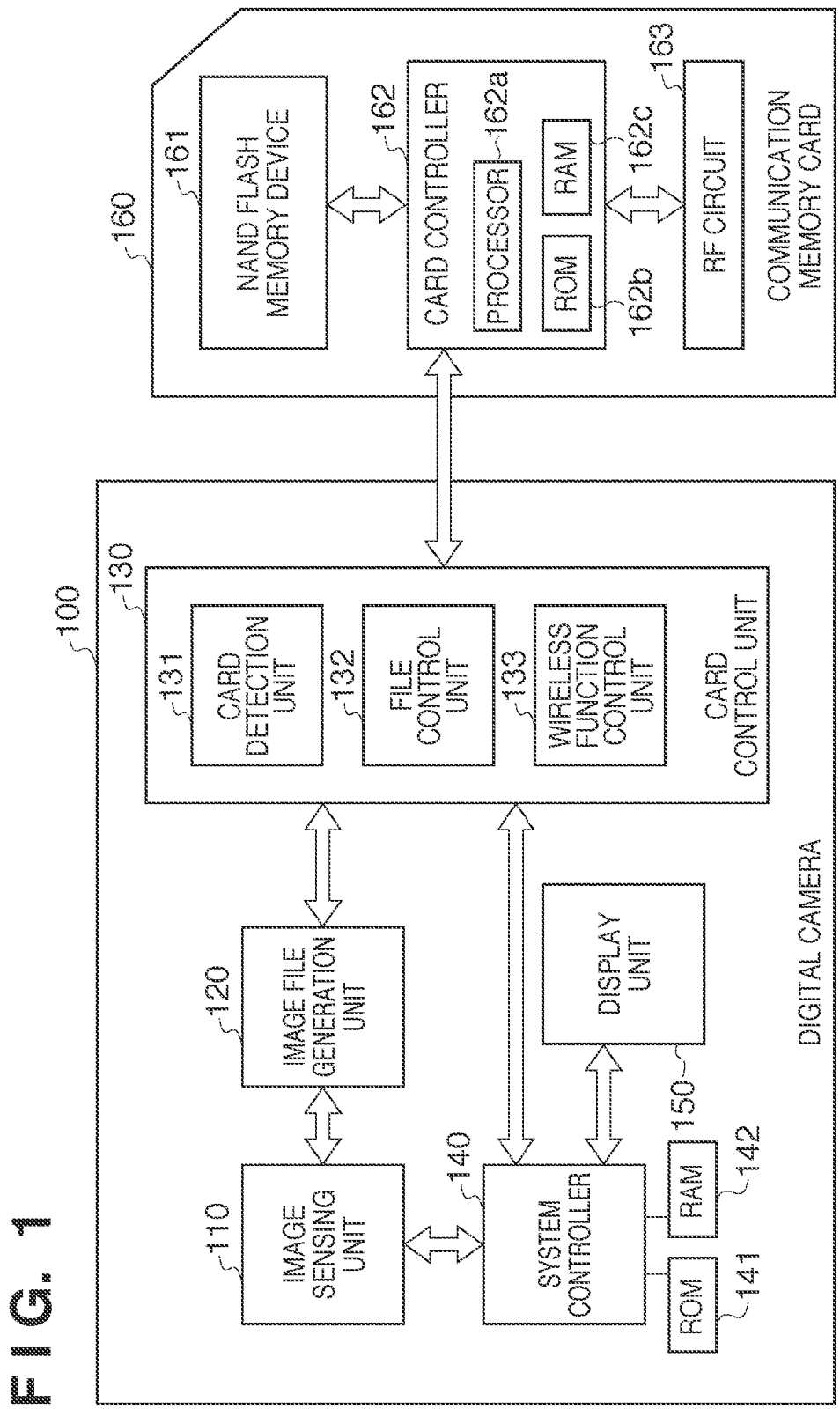

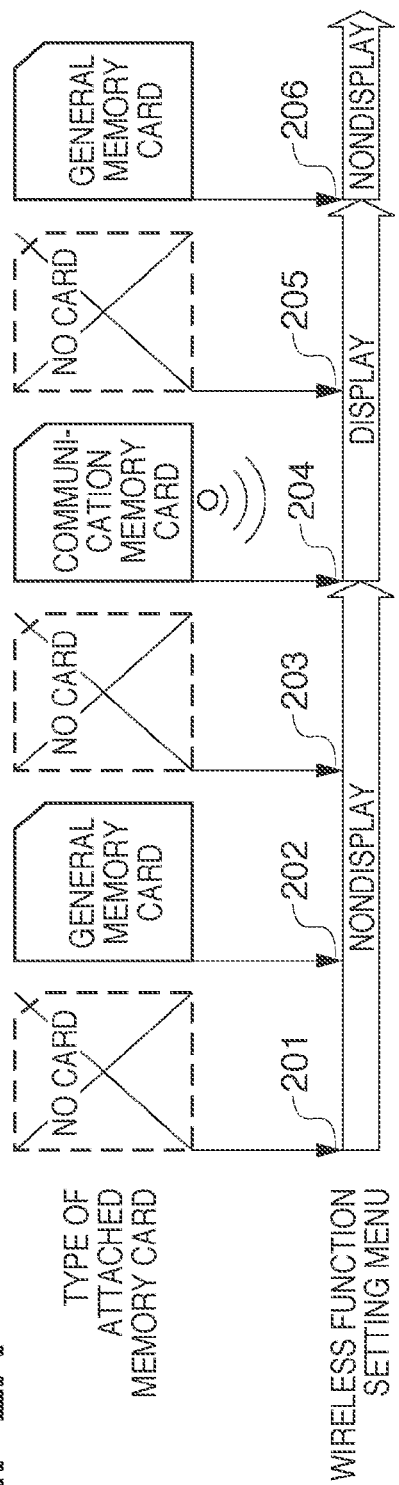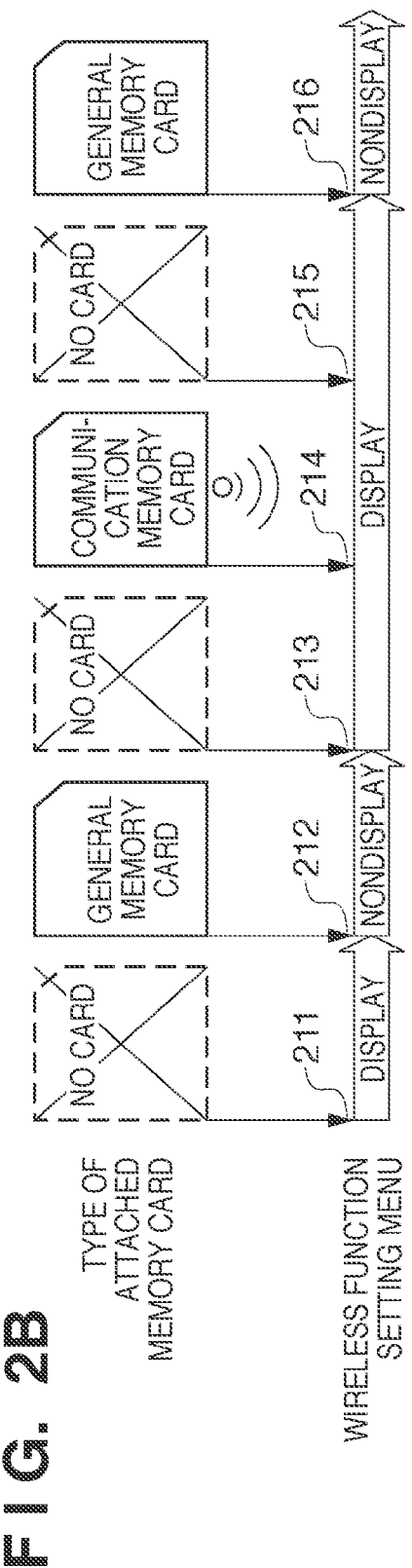

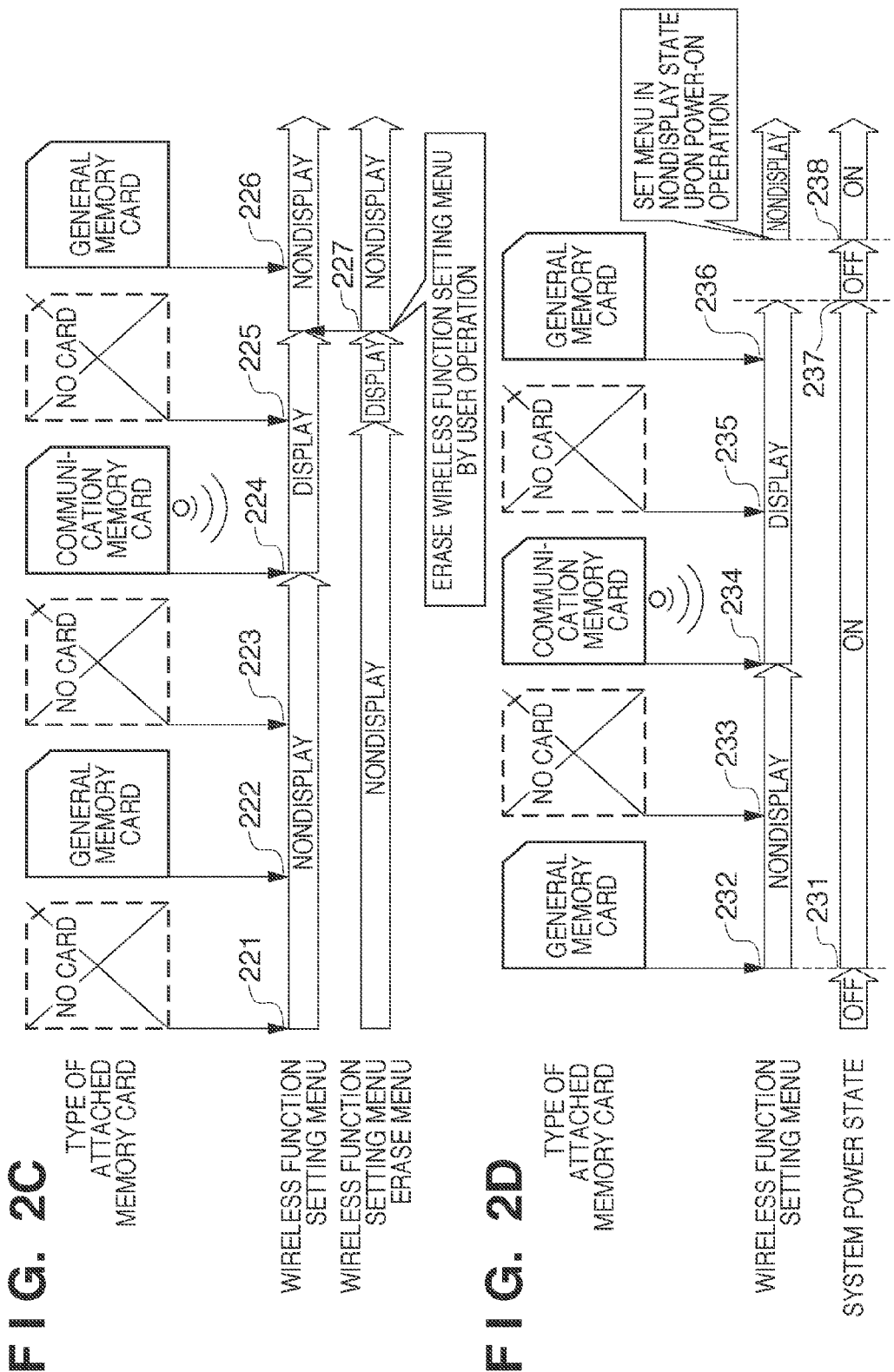

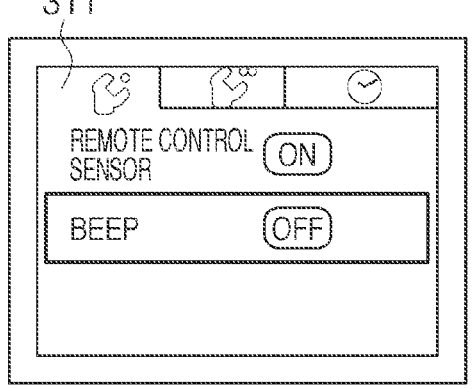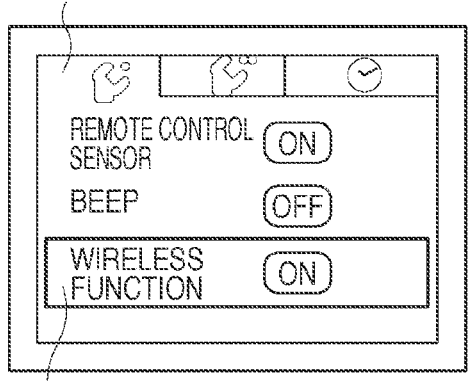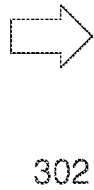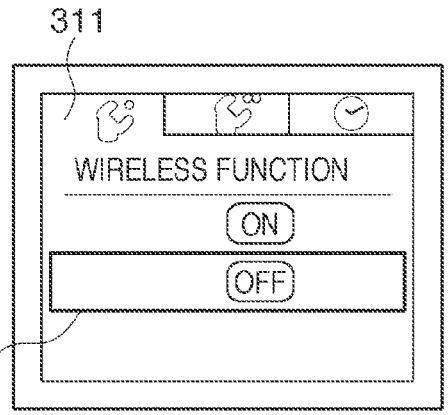
FIG. 3A
FIG. 3B
FIG. 3C
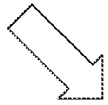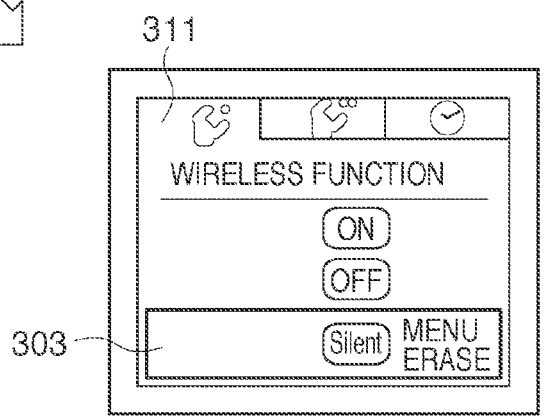
FIG. 3D

DATA RECORDING APPARATUS AND METHOD

BACKGROUND OF THE INVENTION

1. Field of the Invention

The present invention relates to a data recording apparatus and method of recording information in a detachable (removable) recording medium such as a memory card.

2. Description of the Related Art

Generally, a semiconductor memory card is used as a recording medium for a digital camera. Many digital camera users transfer an image file obtained by image sensing from a memory card to a storage device such as the hard disk drive (HDD) of a personal computer (PC). However, this file transfer operation is cumbersome because it is attended with operations of connecting a cable and designating the storage destination directory every time. A memory card (to be referred to as a communication memory card hereinafter) having a wireless communication function is known to solve this problem. The communication memory cards include a memory card that automatically transfers, by wireless communication, image file that is obtained, to an external storage device designated in advance.

Some communication memory cards start transmitting radio waves concurrently with attachment to a host device. However, where wireless transmission is limited, for example, in a hospital, airplane, or region in which use of wireless devices is not authorized, it is necessary to prohibit wireless transmission before powering on the device. To cope with this, Japanese Patent Laid-Open No. 2007-311956 (to be referred to as patent reference 1 hereinafter) has proposed an invention to power on a portable communication terminal while simultaneously pressing a plurality of operation switches so as to limit wireless transmission from the terminal.

However, the method of patent reference 1 requires the user to cumbersomely press the plurality of operation switches for each power-on. To prevent this, menu setting may prohibit wireless transmission from the memory card. In this case, to prohibit wireless transmission in advance, an operation menu to disable wireless transmission needs to be operable even without card attachment. On the other hand, if the menu concerning the communication memory card is always displayed, the operability may be poor for a user who uses no communication memory card. Contrivance is necessary for performing operations concerning the communication memory card while maintaining the menu operability in case of disuse of the communication memory card. However, any arrangement to solve the problems has not been proposed yet.

SUMMARY OF THE INVENTION

The present invention has been made in consideration of the above-described problems, and according to one aspect of the invention, there is provided a data recording apparatus capable of detachably attaching a storage medium having a predetermined function and a storage medium that does not have the predetermined function, and providing an operation menu concerning the predetermined function without loss of operability for a user, and a method thereof.

According to one aspect of the present invention, there is provided a data recording apparatus comprising: a connection unit configured to connect a recording medium, wherein the connection unit is capable of connecting, as the recording medium, a first recording medium having a predetermined function and a second recording medium that does not have the predetermined function; a detection unit configured to detect a connection status of the recording medium to the connection unit; and a control unit configured to control a menu concerning setting of the predetermined function, wherein if the detection unit detects that the first recording medium is connected to the connection unit, the control unit makes the menu operable, if the detection unit detects that the first recording medium is removed and then detects that the second recording medium is connected to the connection unit, the control unit makes the menu inoperable, and the control unit maintains the menu in the operable state during a period from removal of the first recording medium to connection of the second recording medium to the connection unit.

Furthermore, according to another aspect of the present invention, there is provided a method of controlling a data recording apparatus including a connection unit configured to connect a recording medium, wherein the connection unit is capable of connecting, as the recording medium, a first recording medium having a predetermined function and a second recording medium that does not have the predetermined function, the method comprising the steps of: detecting a connection status of the recording medium to the connection unit; and controlling a menu concerning setting of the predetermined function, wherein in the step of controlling the menu, if the detecting step detects that the first recording medium is connected to the connection unit, the menu is made operable, if the detecting step detects that the first recording medium is removed and then detects that the second recording medium is connected to the connection unit, the menu is made inoperable, and the menu is maintained in the operable state during a period from removal of the first recording medium to connection of the second recording medium to the connection unit.

Further features of the present invention will become apparent from the following description of exemplary embodiments with reference to the attached drawings.

BRIEF DESCRIPTION OF THE DRAWINGS

FIG. 1 is a block diagram showing an example of the arrangement of a digital camera according to embodiments;

FIGS. 2A to 2D are views for explaining a user interface switching timing according to the embodiments;

FIGS. 3A to 3D are views showing examples of user interface display according to the embodiments;

DESCRIPTION OF THE EMBODIMENTS

Figure 4:
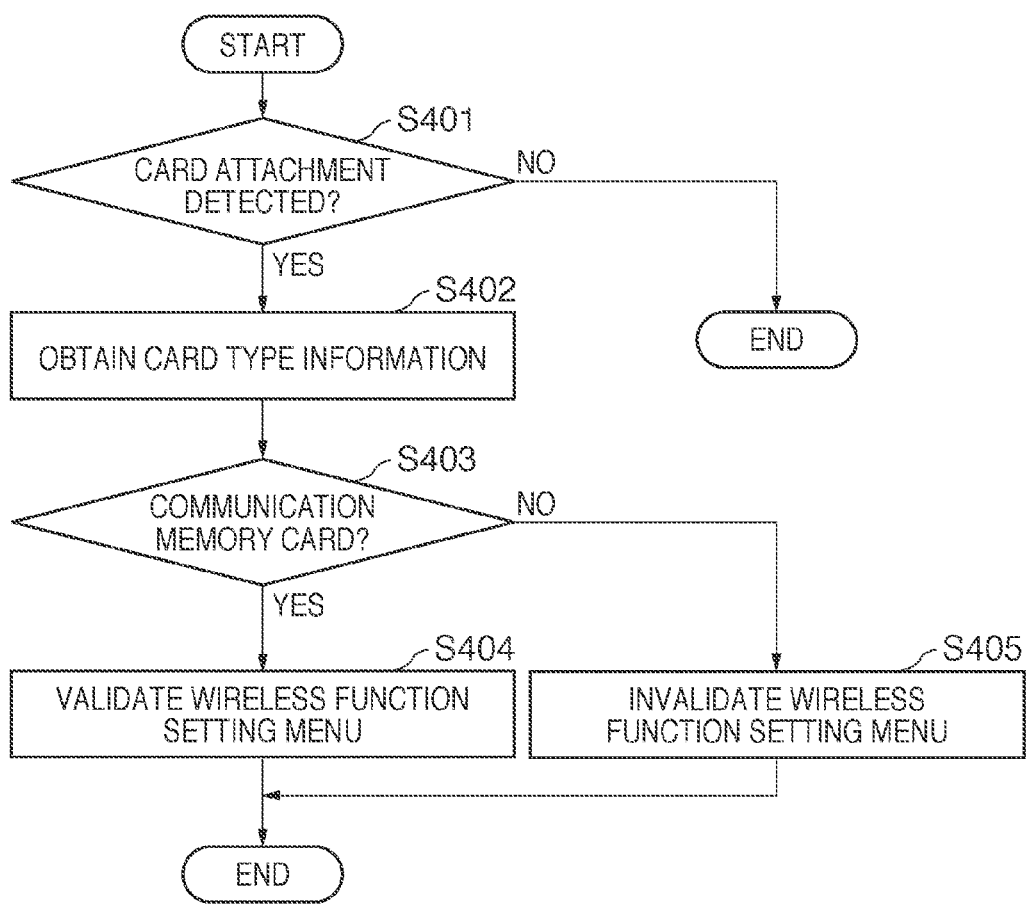
FIG. 4 is a flowchart illustrating menu switching processing according to the first embodiment.

The embodiments will now be described in detail with reference to the accompanying drawings while exemplifying a digital camera as a recording apparatus according to the present invention.

First Embodiment

In the first embodiment, as a data recording apparatus for writing data in a detachable recording medium, a digital camera will be described, which controls the display state of a wireless function setting menu in accordance with the type information of an attached memory card.

FIG. 1 is a block diagram showing an example of the arrangements of a digital camera 100 and a communication memory card 160 according to the first embodiment. Note that although the communication memory card 160 is attached to the digital camera 100 in the block diagram, a general memory card without the automatic transfer function (to be referred to as a general memory card hereinafter) can also be attached to the digital camera 100. That is, the digital camera 100 has a memory slot capable of receiving a communication memory card or general memory card serving as a recording medium.

An image sensing unit 110 includes an image sensor and an optical system (neither are shown). An optical image formed on the imaging plane of the image sensor via the optical system is converted into an electrical signal to obtain image data, thereby performing image sensing. An image file generation unit 120 generates an image file of the image sensed by the image sensing unit 110. A card control unit 130 writes the image file generated by the image file generation unit 120 in a memory card. In the card control unit 130, a card detection unit 131 detects card attachment to the memory slot, and also transmits a command to obtain memory card information to the attached memory card so as to detect, based on received information, the type of attached card. The card control unit 130 also includes a file control unit 132 which controls a file to be generated for write in the memory card, and a wireless function control unit 133 which selectively validates or invalidates the wireless communication function when a communication memory card is attached.

A system controller 140 is connected to a ROM 141 and a RAM 142, and executes various kinds of processing in the digital camera 100 in accordance with control programs stored in the ROM 141. A display unit 150 is formed from, for example, a liquid crystal display device and used to display various kinds of information such as system information, a reproduced image of a recorded image, and a menu concerning wireless function setting. The user can input various kinds of operations using an operation unit (not shown) and an operation menu displayed on the display unit 150 so as to transmit instructions to the system controller 140.

The communication memory card 160 includes a NAND flash memory device 161, card controller 162, and RF circuit 163. Upon receiving a write command from the card control unit 130 of the digital camera 100 serving as a host, the card controller 162 writes an image file in the NAND flash memory device 161 serving as a storage device. The card controller 162 also periodically monitors written files. Upon detecting image file write from the file control unit 132, the card controller 162 transfers the image file to an external storage device by wireless communication via the RF circuit 163. Note that the card controller 162 includes a processor 162a, ROM 162b, and RAM 162c. The processor 162a executes various kinds of programs stored in the ROM 162b, thereby executing each processing in the communication memory card 160.

Note that control of the digital camera 100 may be done by a piece of hardware. Alternatively, a plurality of pieces of hardware may share the processing to control the entire apparatus. This also applies to control of the communication memory card 160.

FIG. 2A is a view showing the switching timing of the wireless communication function setting menu display state according to the memory card attachment state in the digital camera of the first embodiment. The upper line of FIG. 2A indicates the state and type of a memory card attached to the card control unit 130, and the lower line indicates the display state of the wireless function setting menu in a menu list. Upon shipping the digital camera from the factory, the wireless function setting menu is set in a nondisplay state (before a timing 202). When the card detection unit 131 detects attachment of a general memory card (timing 202), the nondisplay state (e.g. a wireless function setting tab/menu is grayed out or deactivated), that is, the invalid state of the wireless function setting menu is maintained (the section between the timings 202 and 203). Even after the memory card is detached (timing 203), the nondisplay state of the wireless function setting menu is maintained, and the wireless function setting menu remains invalid (the section between the timings 203 and 204).

When the card detection unit 131 detects attachment of the communication memory card 160 (timing 204), the wireless function setting menu changes to the display state, that is, the valid state (the section between the timings 204 and 205). Even after the communication memory card 160 is detached (timing 205), the display state (valid state) of the wireless function setting menu is maintained (the section between the timings 205 and 206). Upon detecting attachment of a general memory card (timing 206), the wireless function setting menu changes to the nondisplay state again.

FIGS. 3A, 3B, and 3C are views showing examples of an operation menu according to the embodiment. In this embodiment, an operation environment using the operation menu as shown in FIGS. 3A to 3C is provided to the user. FIG. 3A is a view showing an example of menu display on the display unit 150 when the wireless function setting menu is not displayed. FIG. 3B is a view showing an example of menu display on the display unit 150 when a wireless function setting menu 301 is displayed. When the wireless function setting menu changes to the display state, the wireless function setting menu 301 is added to the menu list displayed by selecting a tab 311, as shown in FIG. 3B. When the user selects the wireless function setting menu 301, a window 302 to be used to switch the wireless function setting is displayed, as shown in FIG. 3C, so as to set "on/off" of the wireless function. If "off" is set on this window, the wireless function control unit 133 shifts to a mode to prohibit transmission of any radio wave from the communication memory card 160. Hence, the user who uses the digital camera and the communication memory card 160 in a place where wireless transmission is prohibited can set the wireless function to "off".

FIG. 4 is a flowchart illustrating valid/invalid switching processing of the wireless function setting menu by the system controller 140. Upon detecting attachment of a memory card (S401), the card detection unit 131 obtains type information of the memory card (S402). The system controller 140 determines based on the type information obtained by the card detection unit 131 whether the attached memory card is a communication memory card (S403). If it is a communication memory card, the system controller 140 validates the wireless function setting menu 301 (S404). If NO in step S403, the system controller 140 invalidates the wireless function setting menu 301 (S405). Note that validating the wireless function setting menu 301 means that when the menu list is displayed by selecting the tab 311 or the like, the wireless function setting menu 301 is displayed so as to be selectable by a user operation. Invalidating the wireless function setting menu 301 means that when the menu list is displayed, the wireless function setting menu 301 is not displayed so as to be unselectable by a user operation. Note that in this embodiment, the menu is not displayed in the invalid state. However, the present invention is not limited to this. For example, the menu may be grayed out.

As described above, in the first embodiment, the display state of the wireless function setting menu is switched in accordance with the type of attached memory card. Even when the memory card is detached, the display state of the wireless function setting menu is held. Note that a memory function of holding the menu state is provided in the wireless function control unit 133 and configured to be nonvolatile even when the system is powered off.

As described above, in the first embodiment, the operation menu concerning wireless communication function setting is validated during the period of attachment of a recording medium (for example, communication memory card 160) having a wireless communication function is being detected. After validated, the operation menu concerning wireless communication function setting is invalidated on condition of not only the simple detached state of the recording medium with the wireless communication function but also detection of occurrence of a specific event. That is, the operation menu concerning wireless communication function setting changes to the nondisplay state when a predetermined event (in the first embodiment, attachment of a general memory card without the communication function) is detected in a state in which the recording medium having the wireless communication function is not attached.

According to the above-described first embodiment, the display state of the wireless function setting menu is controlled in accordance with the type of previously attached memory card. Hence, if a user who uses a communication memory card moves to a place where the wireless function should be off, the wireless function setting menu is displayed even when the memory card is temporarily detached. When the user changes the wireless function to off setting by the menu, and then attaches a communication memory card, it can be used as a simple memory card without transmitting any radio wave. For a user who does not use a communication memory card, the wireless function setting menu is always nondisplayed, and the operability is prevented from being poor due to unnecessary menu display.

Second Embodiment

In the second embodiment, an arrangement will be described, which not only performs valid/invalid switching of the wireless function setting menu according to the first embodiment but also displays (validates) the wireless function setting menu even upon detecting the detached state of a memory card. That is, in the second embodiment, the wireless function setting menu is not displayed only during a period a general memory card is attached. Note that the arrangements of a digital camera 100 and a communication memory card 160 of the second embodiment are the same as in the first embodiment (FIG. 1), and an illustration and description thereof will be omitted.

FIG. 2B is a view showing the switching timing of the wireless communication function setting menu display state according to the memory card attachment state in the digital camera of the second embodiment. The upper line of FIG. 2B indicates the type of a memory card attached to a card control unit 130, and the lower line indicates the display state of the wireless function setting menu in a menu list. In the second embodiment, the wireless function setting menu is displayed in the initial state (before a timing 212). When attachment of a general memory card is detected (timing 212), the wireless function setting menu changes to the nondisplay state (invalid state) (the section between the timings 212 and 213). When the memory card is detached, and the detached state of the memory card is detected (timing 213), the wireless function setting menu changes to the display state (valid state) (the section between the timings 213 and 214).

When attachment of the communication memory card 160 is detected (timing 214), the wireless function setting menu maintains the display state (valid state) (the section between the timings 214 and 215). Even after the communication memory card 160 is detached (timing 215), the display state (valid state) of the wireless function setting menu is maintained (the section between the timings 215 and 216). In the example shown in FIG. 2B, the wireless function setting menu is always displayed in the section between the timings 213 and 216. When a general memory card is attached, a wireless function setting menu 301 changes to the nondisplay state again (timing 216).

Figure 5:
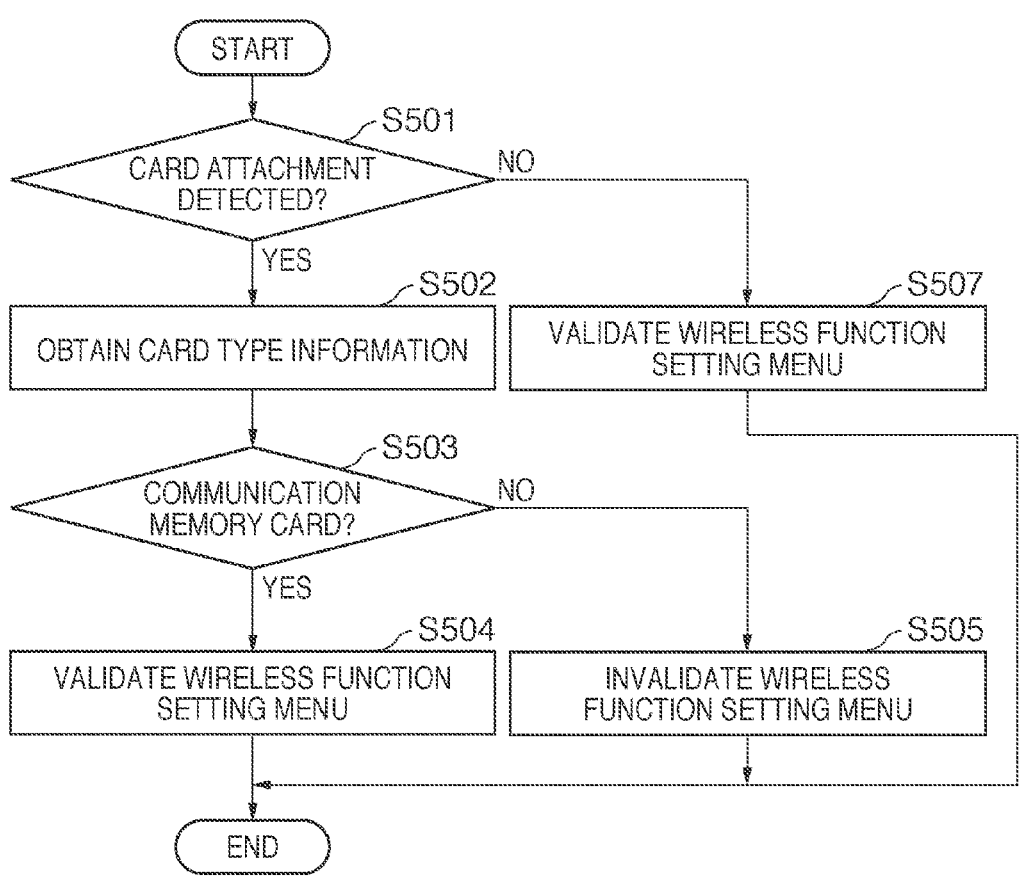
FIG. 5 is a flowchart illustrating menu switching processing according to the second embodiment.

FIG. 5 is a flowchart illustrating valid/invalid switching processing of the wireless function setting menu 301 by a system controller 140 according to the second embodiment. Upon detecting attachment of a memory card (S501), a card detection unit 131 obtains type information of the memory card (S502). The system controller 140 determines based on the type information whether the attached memory card is a communication memory card (S503). Upon determining that it is a general memory card, the wireless function setting menu 301 is invalidated (S505). If card attachment is not detected, that is, a card detached state is detected in step S501, the system controller 140 validates the wireless function setting menu 301 (S507). Note that even when attachment of the communication memory card 160 is detected in step S503, the system controller 140 validates the wireless function setting menu 301 (S504). This is to cope with a situation that the general memory card is exchanged with the communication memory card 160 in a power-off state, and the digital camera 100 is then powered on.

As described above, the period the wireless function setting menu is displayed in the second embodiment corresponds to the sum of the period defined in the first embodiment and the period the card detection unit 131 detects the card detached state. That is, the wireless function setting menu is invalid only during the period a general memory card is attached. In the first embodiment, the memory function of holding the menu state during power-off is necessary. In the second embodiment, however, such a memory function is unnecessary.

According to the above-described second embodiment, for a user who uses a general memory card, display of the wireless function setting menu is invalid, and the operability is prevented from being poor due to unnecessary menu display. If a user who uses a communication memory card moves to a place where the wireless function should be off, the valid state of the wireless function setting menu is maintained even after the memory card is detached. Hence, when the user changes the wireless function to off setting by the menu, and then attaches a communication memory card, it can be used as a simple memory card without transmitting any radio wave. The arrangement can also cope with a situation that the user wants to use a communication memory card as a simple memory card during use of a general memory card. In this case, the general memory card is detached for card exchange, and the wireless function setting menu is displayed at that point of time. Hence, when the user changes the wireless function to off setting, and then attaches a communication memory card, it can be used as a simple memory card without transmitting any radio wave.

Third Embodiment

In the third embodiment, an explicit user instruction to invalidate a wireless function setting menu 301 is used as the above-described specific event. More specifically, in the third embodiment, until a communication memory card 160 is attached, the wireless function setting menu 301 is invalid. Once the communication memory card 160 is attached, the wireless function setting menu 301 is validated. When the wireless function setting menu 301 is valid, and no communication memory card is attached, an operation menu for returning the wireless function setting menu 301 to the nondisplay state is provided. Note that the arrangements of a digital camera 100 and the communication memory card 160 of the third embodiment are the same as in the first embodiment (FIG. 1), and an illustration and description thereof will be omitted.

FIG. 2C is a view showing the valid/invalid state switching timing of the communication function setting menu according to the memory card attachment state in the third embodiment. The upper line of FIG. 2C indicates the type of a memory card attached to a card control unit 130, the intermediate line indicates the display state of the wireless function setting menu in a menu list, and the lower line indicates an erase menu display state upon selecting the wireless function setting menu.

Until the communication memory card 160 is attached (up to a timing 224), the wireless function setting menu 301 is not displayed (the section between timings 221 and 224). When the communication memory card 160 is attached (timing 224), the wireless function setting menu is displayed. When the communication memory card 160 is detached (timing 225), a wireless function setting menu erase menu 303 (FIG. 3D) is displayed, which serves as a menu for returning the wireless function setting menu 301 to the nondisplay state.

FIG. 3B shows an example of menu display on a display unit 150 when the wireless function setting menu 301 is displayed. Once the communication memory card 160 is attached, the wireless function setting menu 301 is displayed in the menu list, as shown in FIG. 3B. When the communication memory card 160 is then detached, the operation window of the wireless function setting menu 301 includes the erase menu 303 to erase the wireless function setting menu 301. That is, when the user selects the wireless function setting menu 301 in FIG. 3B, a window for switching the setting (FIG. 3D) is presented to allow the user to select wireless function setting from "on/off/silent". The difference from FIG. 3C is that the erase menu 303 to instruct to erase the wireless function setting menu is added. When the user selects menu erase, the wireless function setting menu 301 is erased from the menu list so as to change the display to that in FIG. 3A. Note that in this third embodiment, if the user selects the wireless function setting menu 301 while keeping the communication memory card attached, the window without the erase menu 303 is displayed, as shown in FIG. 3C.

Figure 6:
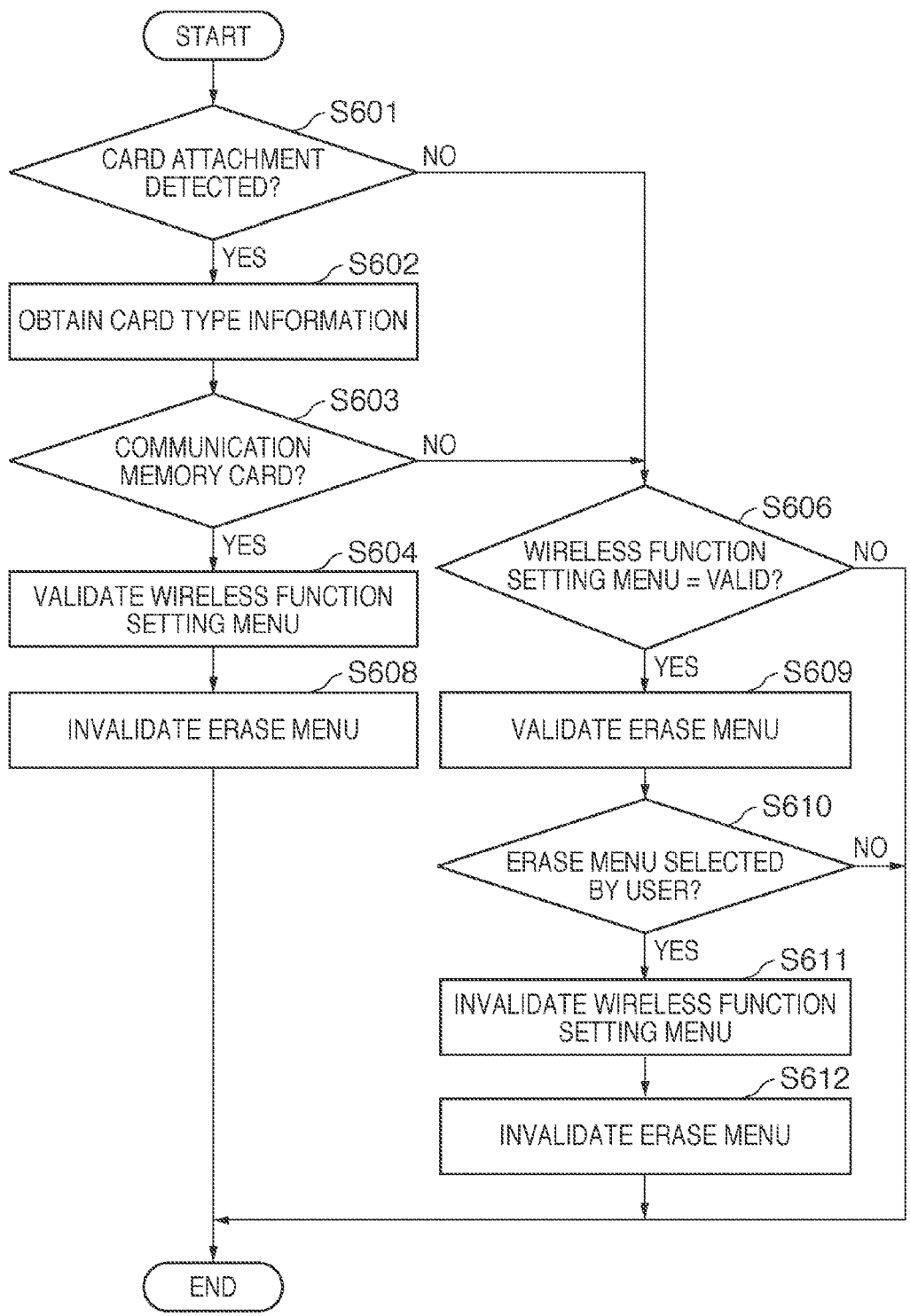
FIG. 6 is a flowchart illustrating menu switching processing according to the third embodiment.

FIG. 6 is a flowchart illustrating valid/invalid switching processing of the wireless function setting menu 301 by the card control unit 130 and a system controller 140 according to the third embodiment. Upon detecting attachment of a memory card (S601), a card detection unit 131 obtains type information of the memory card (S602). The system controller 140 determines based on the obtained type information whether the attached memory card is a communication memory card (S603). If it is a communication memory card, the wireless function setting menu 301 is validated (S604). Since the communication memory card is attached at this point of time, the system controller 140 invalidates the erase menu 303 to erase the wireless function setting menu 301 from the menu items (S608).

If the attached memory card is a general memory card (NO in step S603), or no card is attached at all (NO in step S601), the system controller 140 determines whether the wireless function setting menu 301 is valid (S606). If the wireless function setting menu 301 is invalid, the processing ends directly. On the other hand, upon determining in step S606 that the wireless function setting menu 301 is valid, the system controller 140 changes the above-described erase menu 303 to the valid state (S609). This allows to display the operation window additionally including the erase menu 303, as shown in FIG. 3D, when the user selects the wireless function setting menu 301. Upon detecting in this state that the user has selected the erase menu 303 (S610), the system controller 140 changes the wireless function setting menu 301 and the erase menu 303 to the invalid state (S611 and S612).

As described above, in the third embodiment, upon detecting the detached state of a communication memory card in the valid state of the wireless function setting menu, the operation menu to erase the wireless function setting menu is validated and additionally displayed. In the third embodiment, the display state of the wireless function setting menu is switched in accordance with the type of attached memory card, as in the first embodiment. Even when the memory card is detached, the valid state of the wireless function setting menu is held. Hence, a memory function of holding information representing whether a communication memory card is attached is provided in a wireless function control unit 133 so that the stored contents are nonvolatile even when the system is powered off. When the user selects the wireless function setting menu erase menu, the state of the memory function is cleared to enable returning to the state before the communication memory card is attached for the first time.

According to the third embodiment, since the wireless communication function setting menu is invalidated by the explicit user operation, a user-friendly user interface can be provided.

Fourth Embodiment

In the fourth embodiment, a power-off operation is used as the above-described specific event. More specifically, in the fourth embodiment, a wireless function setting menu 301 is not displayed during a period after the system is powered on until a communication memory card 160 is attached. Once the communication memory card 160 is attached, the wireless function setting menu 301 maintains the display state until the system is powered off. Although the fourth embodiment is similar to the third embodiment, the implementation can be simplified because the menu display state needs not be held during the system power-off period.

In the fourth embodiment, the block configuration is the same as that of the digital camera 100 of the first embodiment, and a description of the block diagram will not be repeated.

FIG. 2D is a view showing the switching timing of the wireless communication function setting menu display state according to the type of memory card in a digital camera 100 of the fourth embodiment. The upper line of FIG. 2D indicates the type of a memory card attached to a card control unit 130, the intermediate line indicates the display state of the wireless function setting menu 301 in a menu list, and the lower line indicates the power state of the system. In the example shown in FIG. 2D, when the system power changes from off to on (timing 231), the wireless function setting menu 301 is not displayed because no communication memory card is attached. Even when a general memory card is attached and detached, the wireless function setting menu 301 maintains the nondisplay state (timings 232 and 233). Once the communication memory card 160 is attached (timing 234), the wireless function setting menu 301 is displayed. From then on, until the system is powered off (timing 237), the display state is maintained independently of the memory card attachment state (timings 234 to 237). When the system is powered off and then on next time, the wireless function setting menu 301 is not displayed (invalid) when executing initialization processing upon power-on (timing 238). Note that although not illustrated, when the power of the system changes from on to off (off to on) while the communication memory card is attached, the wireless function setting menu 301 is immediately displayed.

Figure 7:
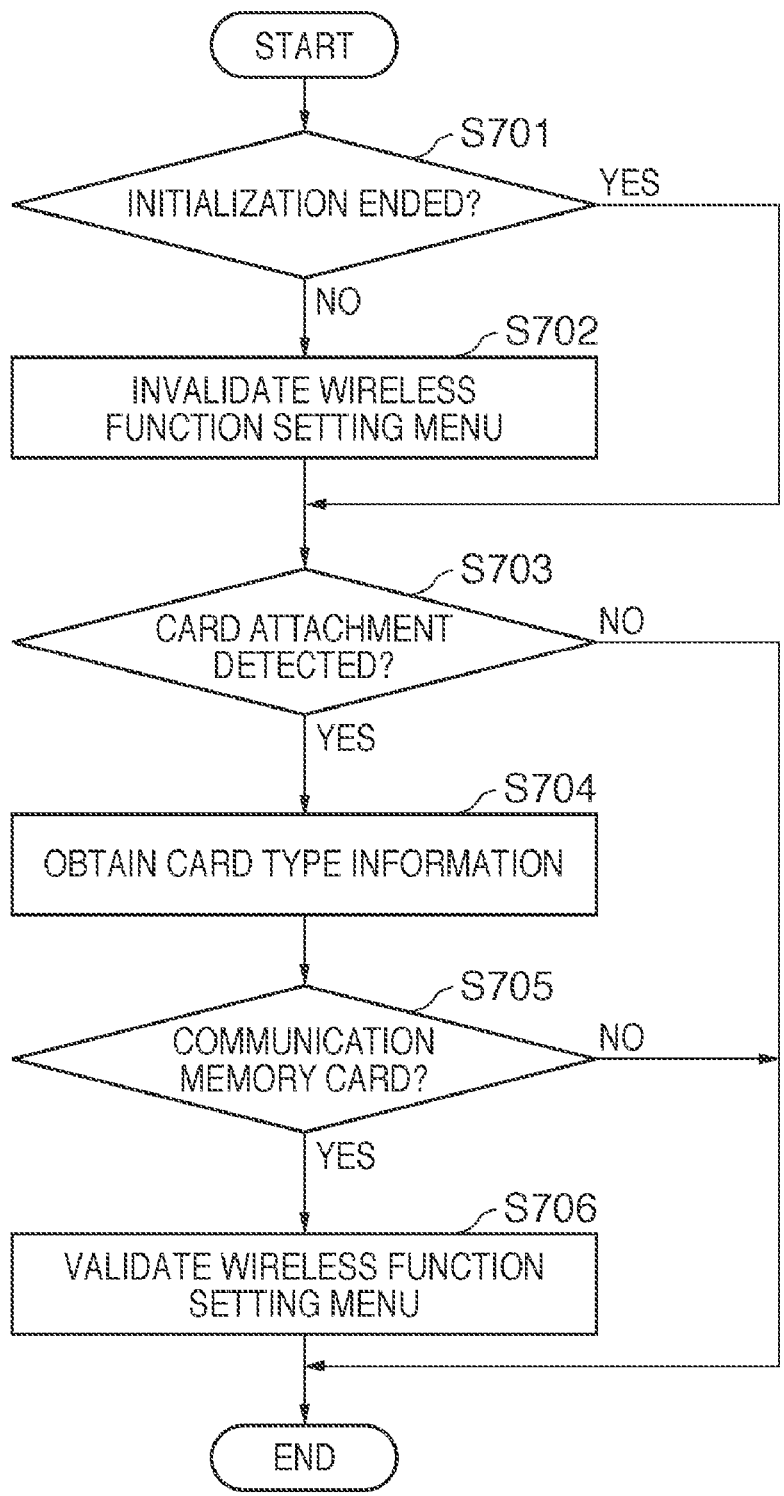
FIG. 7 is a flowchart illustrating menu switching processing according to the fourth embodiment.

FIG. 7 is a flowchart illustrating valid/invalid switching processing of the wireless function setting menu 301 by the card control unit 130 and a system controller 140 according to the fourth embodiment. If initialization processing has not finished yet, the system controller 140 invalidates the wireless function setting menu 301 (S701, S702). Note that initialization processing is to be performed first after the system is powered off. When initialization processing has ended, a card detection unit 131 detects attachment of a memory card (S703), and obtains type information of the memory card (S704). The system controller 140 determines whether the attached memory card is a communication memory card (S705). If it is a communication memory card, the wireless function setting menu 301 is validated (S706). On the other hand, upon determining that the attached memory card is a general memory card (NO in step S705), or card attachment is not detected (card detached state) (NO in step S703), the processing ends.

As described above, according to the fourth embodiment, display of the wireless function setting menu starts at the timing of attachment of a communication memory card. Display of the wireless function setting menu ends at the execution timing of initialization processing upon powering on the system after power-off.

Note that in the first, third, and fourth embodiments, the wireless function setting menu is not displayed before a communication memory card is attached for the first time. A communication memory card may be attached for the first time in a place where wireless transmission is prohibited. To cope with such a scene, the system may be activated under a setting that prohibits wireless transmission by default (that is, automatically) if a communication memory card is attached in the nondisplay state of the wireless function setting menu. In this case, the system is preferably configured to immediately start the menu to enable the wireless communication function.

Note that the above-described embodiments are mere examples of the present invention, and may be combined as needed.

In the above-described embodiments, one card slot is provided. However, the present invention is also applicable to a system having a plurality of card slots. For example, the valid/invalid state of the wireless function setting menu is switched for each card slot, and the processing described in each embodiment is performed for each card slot. Alternatively, for example, the determination in step S403 of the first embodiment is changed to "does any card slot have a communication memory card attached?" so as to generally determine the states of the plurality of card slots. In this case, if at least one card slot has a communication memory card attached to it, the wireless function setting menu is validated. Otherwise, an independent wireless function setting menu may be provided for each card slot. This function is implemented by interpedently (independently) executing, for each card slot, the control associated with the wireless function setting menu of the above-described embodiments.

As described above, according to the embodiments, it is possible to display the menu concerning the communication memory card without degrading the operability for the user.

Note that in the above-described embodiments, a communication memory card having a communication function is applied as a first storage medium having a predetermined function, and a general memory card is applied as a second storage medium that does not have the predetermined function. However, the present invention is not limited to this. For example, a memory card having a specific image processing function may be used as the first storage medium, and a memory card that does not have the specific image processing function may be used as the second storage medium.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-286963, filed Dec. 17, 2009, which is hereby incorporated by reference herein in its entirety.

What is claimed is:
1. A data recording apparatus comprising:
a connection unit configured to connect a recording medium, wherein the connection unit is capable of connecting, as the recording medium, a first recording medium having a predetermined function and a second recording medium that does not have the predetermined function;
a detection unit configured to detect a connection status of the recording medium to the connection unit; and
a control unit configured to control a menu concerning setting of the predetermined function,
wherein if said detection unit detects that the first recording medium is connected to said connection unit, said control unit makes the menu operable,
if the detection unit detects that the first recording medium is removed and then detects that the second recording medium is connected to said connection unit, said control unit makes the menu inoperable, and
said control unit maintains the menu in the operable state during a period from removal of the first recording medium to connection of the second recording medium to said connection unit.

2. The apparatus according to claim 1, further comprising a plurality of connection units, and
said control unit independently controls a menu corresponding to each of said plurality of connection units.

3. The apparatus according to claim 1, wherein if said detection unit detects that the first recording medium is removed and then detects that the second recording medium is connected to said connection unit, said control unit controls to make the menu inoperable by graying out the menu.

4. The apparatus according to claim 1, wherein if said detection unit detects that the first recording medium is removed and then detects that the second recording medium is connected to said connection unit, said control unit controls to make the menu inoperable by setting the menu in a nondisplay state.

5. The apparatus according to claim 1, wherein
the first recording medium comprises a wireless communication unit, and
the predetermined function is a wireless communication function of the wireless communication unit.

6. A method of controlling a data recording apparatus including a connection unit configured to connect a recording medium, wherein the connection unit is capable of connecting, as the recording medium, a first recording medium having a predetermined function and a second recording medium that does not have the predetermined function, said method comprising the steps of:
detecting a connection status of the recording medium to the connection unit; and
controlling a menu concerning setting of the predetermined function,
wherein in the step of controlling the menu,
if the detecting step detects that the first recording medium is connected to the connection unit, the menu is made operable,
if the detecting step detects that the first recording medium is removed and then detects that the second recording medium is connected to the connection unit, the menu is made inoperable, and
the menu is maintained in the operable state during a period from removal of the first recording medium to connection of the second recording medium to the connection unit.

7. The method according to claim 6, the data recording apparatus further includes a plurality of connection units, and
in the step of controlling the menu, a menu corresponding to each of the plurality of connection units is independently controlled.

8. The method according to claim 6, wherein in the step of controlling the menu, if the detecting step detects that the first recording medium is removed and then detects that the second recording medium is connected to the connection unit, control is performed to make the menu inoperable by graying out the menu.

9. The method according to claim 6, wherein in the step of controlling the menu, if the detecting step detects that the first recording medium is removed and then detecting that the second recording medium is connected to the connection unit, control is performed to make the menu inoperable by setting the menu in a nondisplay state.

10. The method according to claim 6, wherein
the first recording medium includes a wireless communication unit, and
the predetermined function is a wireless communication function of the wireless communication unit.

11. A computer readable storage medium storing a computer program which causes a computer to execute steps of a data recording apparatus control method according to claim 6.

* * * * *